United States Patent

Acker

[15] 3,701,098

[45] Oct. 24, 1972

[54] DEVICE FOR MACHINE READING OF INFORMATION WITHOUT MANIPULATION OF THE INFORMATION CARRIER

[72] Inventor: Norbert K. Acker, Koenigstein, Germany

[73] Assignee: Scanner, Inc., Houston, Tex.

[22] Filed: June 15, 1971

[21] Appl. No.: 153,392

Related U.S. Application Data

[63] Continuation of Ser. No. 788,302, Dec. 31, 1968, abandoned.

[52] U.S. Cl. ............340/146.3 H, 235/61.11 E, 250/219 DR, 250/219 D, 250/234 X, 340/146.3 Z

[51] Int. Cl. ............................................G06k 9/04

[58] Field of Search .....250/234, 219, 234 X, 49 DR, 250/49 D; 340/146.3, 146.3 H, 146.3 F, 146.3 Z; 235/61.115, 61.11 E

[56] References Cited

UNITED STATES PATENTS

| | | | |
|---|---|---|---|
| 3,414,731 | 12/1968 | Sperry | 250/219 |
| 3,446,980 | 5/1969 | Meier | 250/234 X |

*Primary Examiner*—Maynard R. Wilbur
*Assistant Examiner*—Leo H. Boudreau
*Attorney*—Smyth, Roston & Pavitt

[57] ABSTRACT

A system is disclosed for reading digitally expressable information from randomly positioned and randomly oriented data fields by detecting presence of a data field in a search field through imaging the search field onto a recognition device and changing position, distortion and magnification of the image until projected onto a read head. Through relative rotation between read head and image or an image therefrom correct orientation for readout is obtained. Particular boundary markings of the data field facilitate position control, particular control markings are used for orientation control. The position control for the data field image is obtained electron optically or through adjustable optical elements.

17 Claims, 6 Drawing Figures

Figure 1:
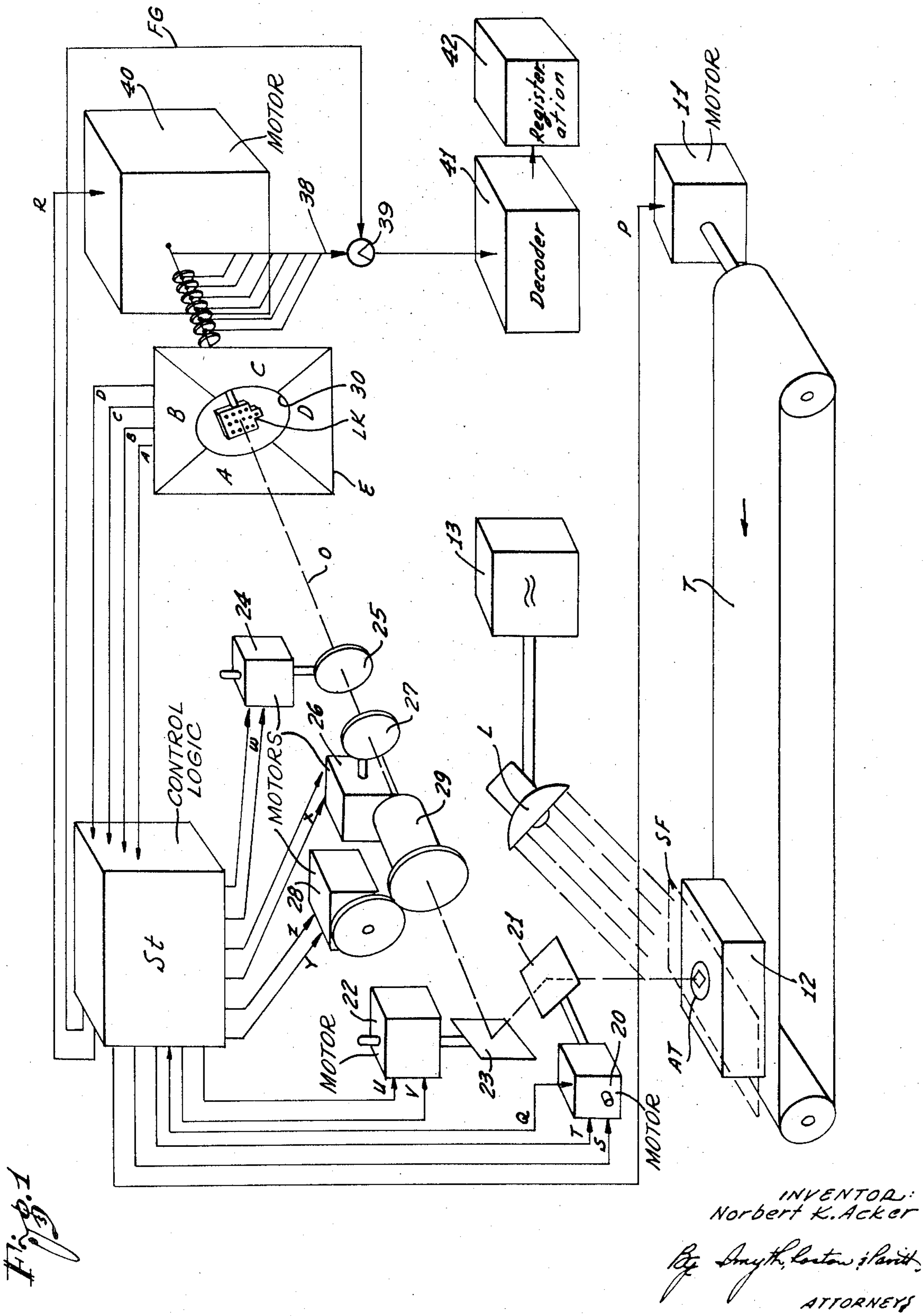

INVENTOR:
Norbert K. Acker

By Smyth, Roston & Pavitt
ATTORNEYS

Fig. 2b

| INPUT SIGNAL | OUTPUT | | |
|---|---|---|---|
| | SIGNAL | COMMAND | EFFECT |
| $D \cdot \bar{B}$ | S | UP | |
| $B \cdot \bar{D}$ | T | DOWN | |
| $C \cdot \bar{A}$ | U | LEFT | |
| $A \cdot \bar{C}$ | V | RIGHT | |
| $B \cdot D \cdot \bar{A} \cdot \bar{C}$ | W | WIDER | |
| $A \cdot C \cdot \bar{B} \cdot \bar{D}$ | X | LONGER | |
| $\bar{A} \cdot \bar{B} \cdot \bar{C} \cdot \bar{D}$ | Y | LARGER | |
| $A \cdot B \cdot C \cdot D$ | Z | SMALLER | |

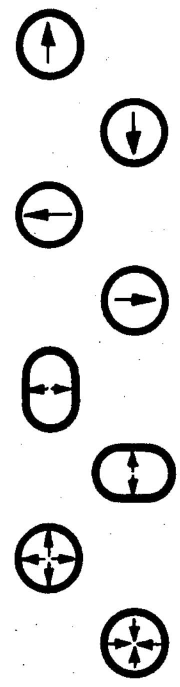

Fig. 2a

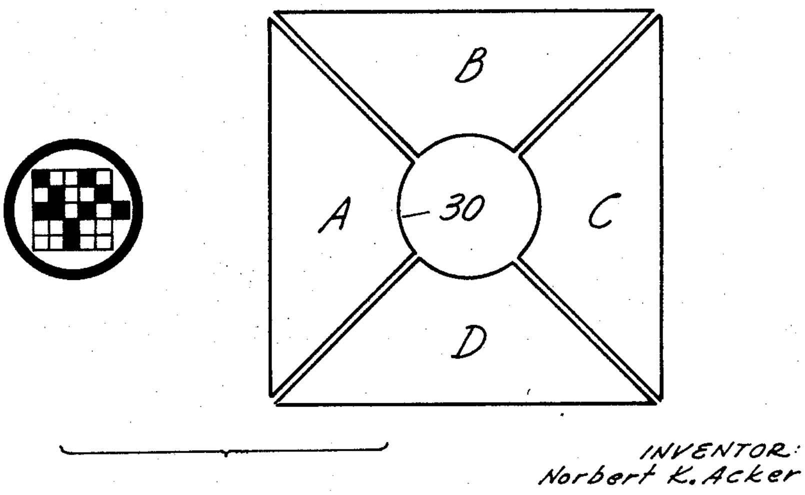

INVENTOR:
Norbert K. Acker

By Smyth, Roston & Pavitt
ATTORNEYS

INVENTOR:
Norbert K. Acker

By Smyth, Roston & Pavitt
ATTORNEYS

INVENTOR:
Norbert K. Acker

By Smyth, Roston & Pavitt
ATTORNEYS

DEVICE FOR MACHINE READING OF INFORMATION WITHOUT MANIPULATION OF THE INFORMATION CARRIER

This application is a continuation of application Ser. No. 788,302 filed on Dec. 31, 1968, now abandoned.

The invention relates to an apparatus for machine reading of information stored on a data carried and by means of an image transmitting device, a read head and a control equipment operating the image transmitting device. Devices are known which machine read and record information from punched or printed cards, labels, tapes or forms. For this purpose, the data storage carrier is inserted into the reading device for establishing the reading position or for precisely positioning the data carrier thereunder. However, in many cases, it is impractical or even impossible to insert the data storage carrier in a reading device, particularly if the data carriers are provided on objects such as identifying labels for merchandise in supermarkets, department stores, warehouses, etc. Also, heretofore the data carrier had to be exactly positioned for machine reading of information on forms and papers. The machine reading of data related to merchandise is a prerequisite for automatic data acquisition of identifying numbers and prices of the merchandise as sold, and this reading should be independent from exact positioning of the data carrier on the individual piece of merchandise.

The known devices are not suitable for this objective. A known device uses x-rays for irradiating the merchandise with the data carrier and guiding same along a plurality of photoelectric reading heads. This, however, is rather expensive. Moreover, in this known equipment, the data are represented in concentric circles of differing radii requiring, accordingly, the data carrier to be relatively large. Still different known devices for machine reading of information operate with repeated scanning of the data storage carrier whereby additional control markers are provided on the storage carrier to which the device must respond in order to indicate agreement between information and reading head so that upon responding of the read head to this control marking the reading proper of the information can be enabled.

Hence, it is known, on one hand, to orient the data storage carrier physically relative to the read head, or, in case of a disoriented storage carrier, to repeatedly scan the carrier until the individual areas thereof have been responded to in proper reading position. In case of the first type of equipment, storage carriers being severely disoriented in relation to the travel path can be read only by mechanically forcing them into a proper reading position. In case of square-shaped data storage carriers having position independent codes, it is additionally possible to force orientation independent from the respective longitudinal position of the storage carrier. Devices operating with repeated scanning are capable of compensating only very small angular deviations of the data storage carrier from the direction of travel or of scanning, particularly if the read speed is not to be reduced significantly.

It is an object of the present invention to read information from storage carriers in which the data fields are oriented in relation to the direction of transport movement at random angles and which, in addition, can appear to be laterally displaced within limits in relation to the direction of transport movement, whereby particularly reorientation of the storage carrier as well as repeated scanning is to be avoided. It is a more particular object of the present invention to detect a data field on a storage carrier even if the storage carrier has an angle in relation to the scanning plane, whereby the data field has been placed on a merchandise wrapper which is passed on a conveyor belt along a reading station.

The problems posed by the objects of the invention are solved in that a recognition device is placed in relation to the storage carrier the data field of which is not properly oriented for reading, for recognizing and detecting the position of the data field on the storage carrier or of a particular recognition marking thereon, whereby the recognition device cooperates with a control device detecting the data field on the storage carrier as a whole, and controls its imaging upon the read head to obtain correct orientation for reading. This recognition device can be separated from the read head or can form a structural unit therewith.

The device, in accordance with the present invention, differs from the known devices by the detection of the data field on a storage carrier as a whole, and by controlling the position of the image of the data field by means of a control device, as long as and until it has the correct orientation for reading by the read head. The recognition device has matrix-like configuration which is coupled to the control device through a logic circuit in order to fulfill its required function. The recognition device, in accordance with the invention, can also be constructed in the form of a so-called telautograph. The recognition device can be realized in different manners, as will be explained more fully below.

The control circuit receives information from the recognition device for controlling imaging of the data field on the storage carrier and cooperates with adjusting elements operatively coupled to imaging and image transmitting elements and devices. The construction of these adjusting elements depend naturally to a considerable extent upon the construction of the imaging and image transmission device. The control exercised by the control device relates particularly to increase or decrease of image magnification, lateral shifting of the image, as well as distortion correction thereof.

The imaging and image transmission device can be constructed as an optical projection system or it may include fiber optics or electron optical equipment, or a combination of such devices. As a special case, the recognition marking of the data field on the storage carrier can be the data field itself. However, a separate circular or ring-shaped marking can be employed with any kind of contour. In case of a ring-shaped marking, square-shaped or circular ring-shaped contour is preferred.

In accordance with the invention, a search field in which the data field storage carrier may be found, is scanned as a whole. The image of the detected data field is reoriented by operation of the recognition device to be projected onto the reading head itself. In order to correct the angular position of the data field on the storage carrier, and of the image thereof relative to the read head, image and read head are rotated in relation to each other, using, for example, suitable optical or electronic means for causing the image to rotate. By employing additional control markings the read head can be rotated relative to the image (or vice versa) until the image of the data storage carrier is oriented in relation to the read head in format matching position. Alternatively, the read head may be supported for continuous rotation or the image can rotate continuously, and during each revolution the correct position for reading of the image of the data field of the storage carrier is detected. The transfer of the information read is controlled by scanning of the control marking.

In case the data storage carrier travels continuously through the search field, mentioned above, it may be of advantage to retard or even to stop the drive mechanism as soon as the recognition device has detected the presence of a data field in a storage carrier in the search field. For this purpose, the recognition device is matched to the contour of the search field unless there is an area by area scanning of the search field transverse to the propagation path of the storage carrier.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates somewhat schematically and in perspective view a device in accordance with a preferred embodiment of the present invention;

FIG. 2*a* is an illustration serving to explain a data storage carrier and a recognition device;

FIG. 2*b* is a table used to explain operation of the device in accordance with FIG. 2*a;*

Figure 3A:
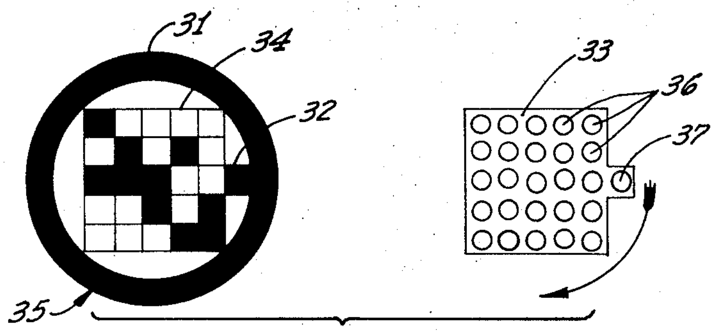
Figure 3B:
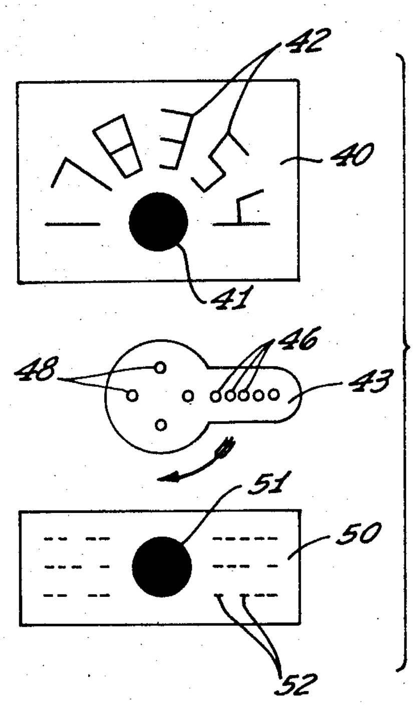
Figure 4:
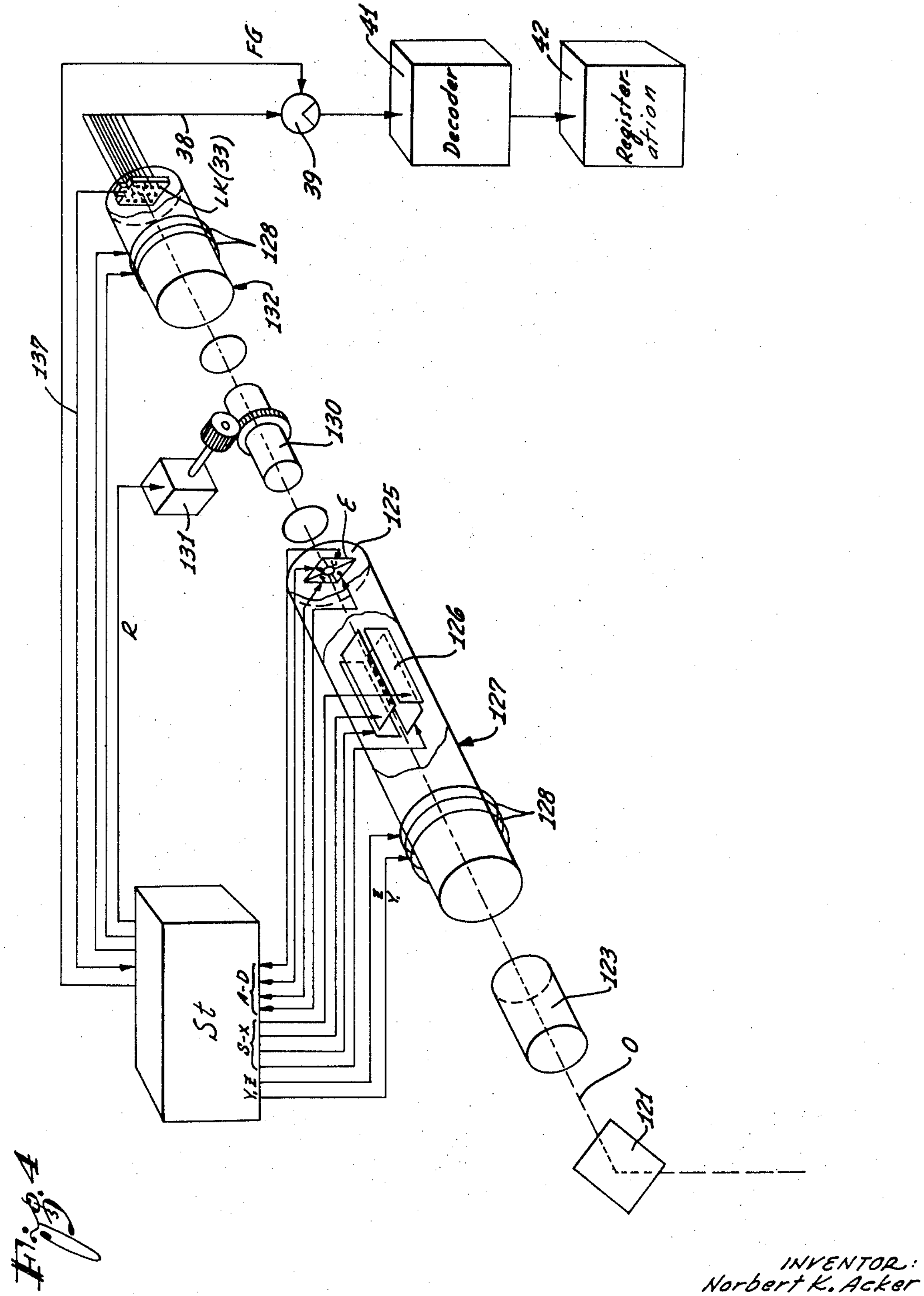

FIGS. 3*a* and 3*b* are examples for the construction of the data storage carrier and of the read head; and FIG. 4 is another example of the preferred embodiment of the invention.

Turning now to FIG. 1, there is illustrated schematically and in the form of a block diagram a device in accordance with the invention. A conveyor belt T is driven by a motor 11. Items of wrapped merchandise, such as 12, are on the conveyor belt serving as storage carriers for a data field AT. The wrapped merchandise 12 with data field AT pass through a search field SF schematically illustrated (dashed line). The search field SF is illuminated by means of a lamp L which is powered by a frequency generator 13.

The device, in accordance with the invention, serves to recognize a data field as soon as it passes through the search field and to detect the data field in such a manner that the optical axis 0 of the reading equipment becomes oriented in relation to the data field itself. For this purpose there is first provided a recognition device E illustrated additionally in FIG. 2*a* to facilitate explanation of the table in FIG. 2*b*. The data field may, for example, have configurations as illustrated on the left-hand side of FIG. 2*a*. Of course, the invention is restricted neither to employment of the illustrated number of 25 incremation bits, nor to the circular boundary marking (recognition marking) of the data field.

The recognition device E is preferably matched to the configuration of the search field but at a reduced scale. The recognition device E includes four quadrant sectors A, B, C and D. As soon as a data field enters the search field, its image is projected onto one of the quadrant sectors of the recognition device E. Accordingly, this particular quadrant feeds a signal to a control device ST which includes a logic circuit to convert this and other signals provided by the recognition device into control signals which pass to the respective adjusting elements via the illustrated lines. The generation and effect of these signals on basis of logic relations is summarized in the table of FIG. 2*b*.

The signals S, T, U, V, W, X, Y, Z pass through the correspondingly designated lines in FIG. 1 to adjusting elements illustrated schematically. The adjusting elements of the embodiment shown in FIG. 1 are of the electromagnetic type, such as, for example, electric motors, A motor 20 is energized by signals S and T to pivot a mirror 21 in a particular plane. A motor 22 pivots a mirror 23 in the respective orthogonal plane and is operated by the signals U and V. A motor 24 receives signal W to pivot an optical element 25 which extends the image in a meridional plane. Analogously, a motor 26 receiving signal X pivots a similar optical element 27 in a plane transverse to the plane of rotation of element 25 to stretch the image in the sagittal plane.

The imaging system proper is comprised of an additional lens system and is illustrated schematically as a vario or panchromatic objective 29. This lens system projects an image of the data field AT onto the recognition device E. The vario objective 29 is adjusted by means of a motor 28 which receives signals Y and Z. As one can see, upon adjusting the optical elements 21, 23, 25, 27 and 29, control operations are obtained, as shown in the table of FIG. 2*b*, to cause the image of the data field to be projected in matching configuration within the inner circular boundary 30 of the recognition device.

The read head shown in FIG. 1 and designated therein generally by LK is separately illustrated in FIG. 3a, and designated here by numeral 33. This read head 33 has a contour which matches the contour of the information field 34 proper within the data field 35 (AT). In dependence upon the construction and the optical properties of the imaging and image transmission device, the read head 33 may be smaller or larger than the information field proper within the data field, or these fields may have similar size. The read head 33 is comprised of photoelectric elements 36 in a manner known, per se, which elements may be photo diodes, or the like. The data field itself includes a boundary marking 31 which proportionally agrees with the inner boundary 30 of the recognition device and by operation of which the image of the data field, and particularly of the information field thereof, is imaged onto the read head.

In the embodiment illustrated in FIG. 1, the read head LK itself is rotatably driven by a motor 40. This rotary motion can be clocked from the control device through lines R. Instead, however, the logic circuit in the control device St and as connected to the recognition device, may provide signals to control the motor 40. As soon as the image of the data field as projected onto the read head, i.e., more generally into the plane of the read head, has correct size, the information in the information field can be read by the read head.

As the data field (i.e., the image thereof) is angularly oriented at random in relation to the read head, the read head will attain correct reading position once during each revolution. In order to identify this position, the data field is provided with a control marking 32. This control marking 32 is associated with a photoelectric reading element 37 on the read head. As soon as element 37 detects the image of control marking 32, an enabling signal is provided by the control device ST via a line FG to a gate circuit 39. The read elements 36 of the read head has output lines 38 which in turn connect also to the gating circuit 39. As the gating circuit 39 is enabled by the signal in line FG, the information as read is transferred to a decoder 41. The decoder tests the code and if the information is recognized as being without error, the information is transferred to a registration device 42. It should be noted that the gating circuit 39 in FIG. 1 is a simplified illustration of a plurality of gates (logic AND circuits) connected to a corresponding plurality of read lines 38, as preferably the information is transferred in parallel from the read head to the decoder.

Preferably the information is read several times, i.e., repeatedly during sequential revolutions of the read head, but is transferred only at a particular instant. FIG. 1 illustrates, furthermore, another output line P originating in the control device ST. The signal in this line causes braking or even stopping of the drive motor 11 for the conveyor belt T. This signal is triggered in the illustrated embodiment whenever recognition device E has detected a data field AT within the search field SF.

FIG. 3 illustrates two additional possible encodings for the data field. In both cases, the information is arranged around a center on circular tracks. In case a data field has configuration as shown at 40 in FIG. 3*b*, the information is printed in symbols 42 which are optically, as well as machine readable. The recognition markings 31 of the particular data field 35 as previously described, is repeated in this case by a recognition marking 41. The particular data field 50 in FIG. 3*b* has also a recognition marking 51 in the form of a circular,disc-shaped area. The information is represented by a dot raster 52 arranged around the center of recognition marking 41 and in circular tracks. In this case, each of the circular tracks which are not directly shown but extend around the center, corresponds to an information channel.

The particular read head 43, in accordance with FIG. 3b, has a row of light sensitive elements 46 which are respectively arranged exactly on one of the circular tracks referred to above. This arrangement corresponds to an arrangement known, per se, for a linear feeding path as used for reading punched tape, punched cards, or special coding. The read head 43 additionally includes four light sensitive elements 48. These are arranged on the periphery of a circle which corresponds to the periphery of the circular area of the recognition marking 41 and 51. These four elements 48 trigger reading of information as soon as none of them receives a signal from the recognition marking. This will be the case if the image of the data field is centered exactly to the read head. Elements 48 can serve as partial substitutes for the elements A, B, C and D of the recognition device with regard to some of their functions.

The embodiment illustrated in FIG. 1 operates optic-electrical, mechanical optical and electrical mechanical. In the embodiment illustrated in FIG. 4, almost exclusively electron optical means are provided for the imaging and image transmission device. Electronic means in the embodiment of FIG. 4 are almost exclusively substituted for the electro-magnetically operating adjusting elements in FIG. 1. Parts agreeing with parts in FIG. 1 are identified in FIG. 4 by similar reference numerals.

The optical axis 0 is first deflected into a different plane by means of a mirror 121. A projection objective 123 produces an image of the data field imaged in turn onto the target screen 125 of an image converter tube 127. The screen 125 includes operating area elements constructed and contoured in accordance with the recognition device E of FIG. 1, and having the same function. An electron lens 128 in image converter tube 127 causes increase of the magnification of the image of the data field. The deflection of the image in two orthogonal directions is caused by deflecting electrodes 126.

At the optical output side of the image converter tube 127 there is provided a prism arrangement 130 which is rotated by means of a motor 131. The motor 131 is controlled from the control device ST via the lines R. The prism device 30 which is known per se, rotates the image of the data field until matching relationship between read head and data field image is signaled to the control device ST via the return signal line 137. The return signalling line 137 is connected to element 37 of the read head which element responds to and detects the image of the control marking 32. The read head 133 of the embodiment in accordance with FIG. 4, is arranged in an image convertor tube 132. Image convertor tube 132 includes the elements of the read head in the form of dot shaped elements 133.

The illumination of the search field is provided by means of a pulsating radiation source, preferably constructed as an ultraviolet radiator. The radiation pulses permit the creation of conditions required to read the information with certainty. It is possible to distinguish therewith an information signal from a signal triggered through a different light source, for example an AC amplifier recognizes and transmits the information signal only and rejects all other signals. The data storage carrier is preferably provided with a layer of fluorescent or luminescent dye. This layer is destroyed upon printing the information in the form of an area pattern. The areas of the data field 35 illustrated in black in FIG. 3 remain as dye layer. This layer furnishes a more contrasting image upon being radiated with UV radiation which in turn facilitates recognition and reading. Utilization of a layer which responds to UV radiation has the advantage that the data field proper is more readily recognizable in relation to the differently colored wrapping for the merchandise so that recognition of an incorrect marking is avoided. If the data field has a white surface, then the recognition marking 31 preferably remains as a white ring after printing.

After the data field has been detected by the recognition device, the adjusting elements cause follow up control to follow the motion of transportation. The data field leaves the search field after reading and care has been taken that as adjusting member 20 or deflecting mirror 21 has reached a limit position, a signal Q is provided to the control device. This signal compensates the transport motion, so that the optical axis is returned to traverse the center of the search field or the leading edge thereof. The signal Q can additionally be used to stop motor 11 by means of the control signal P or to retard further motion as soon as there is the danger that the data field leaves the search field prior to termination of reading the information.

The invention is not limited to the embodiments described above but all changes and modifications thereof not constituting departures from the spirit and scope of the invention are intended to be covered by the following claims.

I claim:

1. A device for reading information established by data markings in a data field on a carrier, the carrier having random position and random orientation in a particular area and appearing at random times within that area, the data field position identified by a contrasting marking having contrasting contour surrounding the data markings in the data field as boundary thereof, the area in which any portion of the data field may appear being larger than the data field itself, the combination comprising:
   - first means disposed in relation to the particular area and having particular configuration and characteristics for reading information and providing signals representative thereof;
   - second means defining an optical path between the particular area and the first means and providing an image of the area and of a data field with its data markings when in the area, the second means including adjusting means in the optical path for displacing the image relative to the first means without displacement of the carrier, the adjusting means including means (a) for laterally shifting the image in two transversely oriented directions relative to the first means, and means (b) for rotating the image relative to the first means;
   - third means including a plurality of individual detectors disposed in the optical path, the second means projecting the particular area onto the detectors, so that a contrasting boundary marking, when in the area, is imaged on at least one of the detectors, the detectors each having particular contour portion, together outlining the image of the boundary of a data field for a reading position of the data field image, the detectors being individually responsive to an image of the contrasting boundary marking or of a portion thereof, as produced by the second means;
   - the third means further including circuit means connected to the detectors of the plurality for detecting the image of said boundary and providing signals representative of the relative position of the image of the boundary in representation of the disposition of the image of the data field with the data markings relative to the reading means; and
   - fourth means connected to be responsive to the signals as provided by the third means for operating the adjusting means to laterally shift the image of the data field relative to the first means to place the image of the boundary in matching disposition to the contour outlined by the detectors of the plurality, so that an image of the data markings is provided to the reading means for data reading;
   - the detectors having contour and disposed to be outside of the area circumscribed by the boundary image and containing image of the data markings when the image of the contrasting boundary has matching position on the contour portions of the detectors.

2. A device as set forth in claim 1, wherein a data field is provided also with marking defining the angular orientation of a non-circular data field, the third means including a particular detector to control the first means when the image as rotated by the means (b) has particular angular orientation to the reading means.

3. A device as in claim 1, the circuit means as connected to the detectors additionally responsive to the size of the data field image within the imaged boundary, and means (c) in the optical path for adjusting the image size to fit into the contour as outlined by the detectors.

4. A device as in claim 1, wherein means (c) are included in the optical path to optically distort a data field along at least one said direction, the circuit means as connected to the detectors responsive to distortions of the data field boundary image relative to the contour as outlined by the detectors of the plurality, to control the means (c) for correcting the distortion.

5. A device as in claim 1, the second means including electron optical means.

6. A device as set forth in claim 1, the second means including at least one image converter having a target screen.

7. A device as set forth in claim 6, the detector provided on the target screen of the image converter, being responsive to an electron image of the data field produced on the target screen.

8. A device as set forth in claim 6, the data reading means comprising sensitive elements on the target screen to be resppnsive to an electron image of the data field.

9. A device as set forth in claim 6, the second means being reset in response to the data field's leaving the particular area.

10. The combination set forth in claim 1, wherein the adjusting means are optical and wherein means are mechanically operative upon the adjusting means to provide a controlled adjustment by the adjusting means.

11. A device as in claim 10, the contrasting marking including a fluorescent marking, the device including an illuminating source for stimulating the flourescence of a marking when in the particular area, the contour defined as boundary between a fluorscent area and a non-fluorescent area on the carrier.

12. A device as in claim 11, the illuminating source being a pulsating source, the circuit means including means responsive to the pulsations in the image.

13. A device as in claim 12, the source providing ultraviolet radiation.

14. A device for reading information established by data markings in a data field on a carrier where the data field is circumscribed by particularly contoured boundaries, the carrier having random position and random orientation in a particular area and appearing at random times within that area, the combination comprising:

reading means disposed in relation to the particular area and having a particular configuration and characteristics for reading information and providing signals representative thereof;

means defining an optical path between the carrier and the reading means to provide an image of the carrier on the reading means to obtain reading by the reading means of the image of the data markings in the data field on the carrier, when the image of the data field on the carrier has particular reading position, the optical means being adjustable for adjusting the data field image relative to the reading means;

means including plural detectors disposed on the same optical path as the reading means, in optical alignment therewith and in particular spatial relation to the image of the contour of the boundaries, for sensing the disposition of the image of the contour of the boundaries of the data field and to provide indications representing the displacement of the boundaries of the data field on the carrier from a particular relationship, the particular relationship defined by a tangent position of the boundary contour image to each of the detectors, while the data markings as imaged are displaced from the detectors, so as to establish the reading position of the images of the data markings with respect to the reading means outside of the range of the detectors;

means responsive to the indications provided by the sensing means for adjusting the optical means in directions for providing the particular tangent relationship between the image of the boundaries of the data field on the carrier and the detectors of the sensing means, placing the images of the data markings in reading position to the reading means; and means responsive to the particular relationship between the boundaries of the data field on the carrier and the reading means for obtaining a processing of the information read in the data field by the reading means.

15. A device as set forth in claim 14, wherein the optical means are adjustable in at least a pair of transverse directions and wherein the adjusting means are operative to adjust the optical means in the pair of transverse directions to provide a symmetrical relationship between the images of the boundaries of the data field on the carrier and the detectors.

16. A device as set forth in claim 14, wherein the optical means are adjustable in at least a rotary direction and wherein the adjusting means are operative to adjust the optical means in the rotary direction to provide the particular relationship between the boundaries of the data field on the carrier and the reading means.

17. A device as set forth in claim 14, wherein the optical means are adjustable in at least a pair of transverse directions and in a rotary direction and wherein the adjusting means are operative to selectively adjust the optical means in the transverse directions and in the rotary direction to provide the particular relationship between the boundaries of the data field on the carrier and the reading means.

* * * * *